Mar. 20, 1923.
G. S. LEWIS.
CRANK HANGER ASSEMBLY.
FILED JUNE 8, 1921.
1,449,235.
2 SHEETS—SHEET 1.
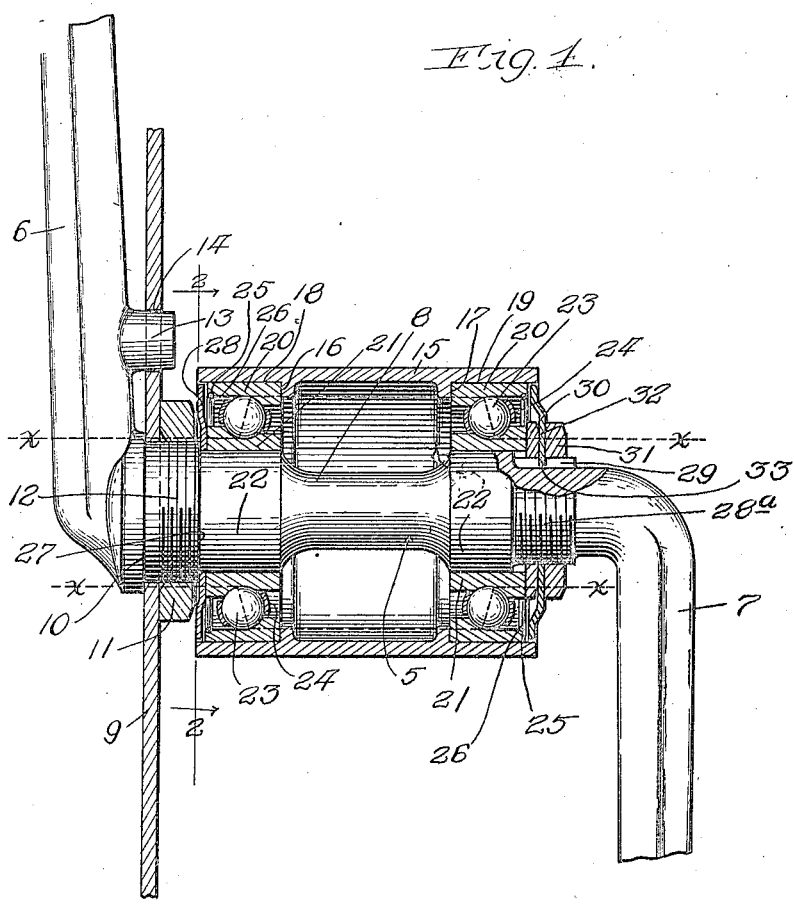
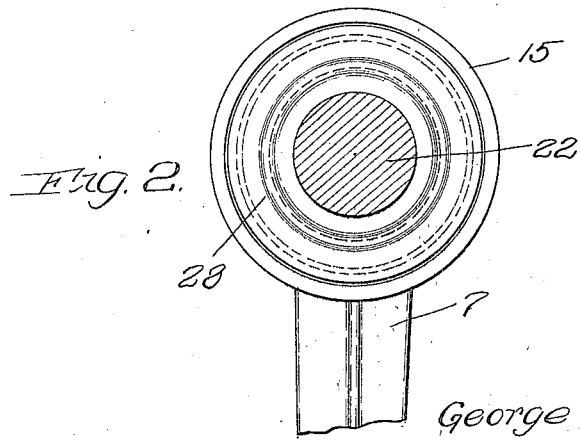
Inventor,
George S. Lewis.
By Dyrenforth, Lee, Chritton & Wiles.
Attys.

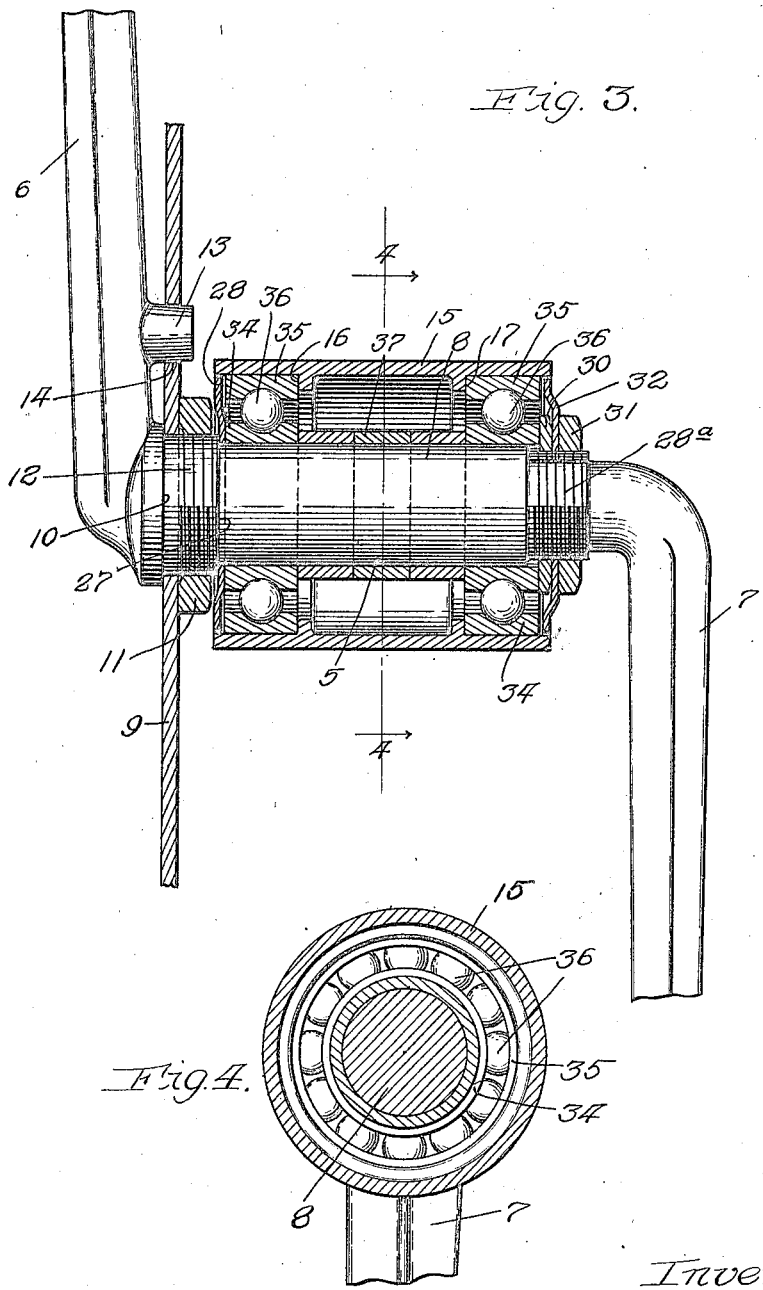

Patented Mar. 20, 1923.

1,449,235

UNITED STATES PATENT OFFICE.

GEORGE S. LEWIS, OF OAK PARK, ILLINOIS, ASSIGNOR TO MEAD CYCLE COMPANY, OF CHICAGO, ILLINOIS, A CORPORATION OF ILLINOIS.

CRANK-HANGER ASSEMBLY.

Application filed June 8, 1921. Serial No. 476,033.

*To all whom it may concern:*

Be it known that I, GEORGE S. LEWIS, a citizen of the United States, residing at Oak Park, in the county of Cook and State of Illinois, have invented a new and useful Improvement in Crank-Hanger Assemblies, of which the following is a specification.

My invention relates more particularly to the crank hanger assembly of a bicycle which, according to prior practices, involves the screwing of the cones forming the inner raceways for the balls of the bearings, upon the shaft of the crank, which presents a number of objections certain of which are the improper alinement in certain instances, of the raceways of the bearings, producing undue wear of the bearings and impairing the proper functioning thereof and involving considerable time in the assembling of the various parts of the structure.

One of my objects is to provide a crank hanger assembly wherein the use of inner raceways for the balls screwed upon the crank are eliminated, and substantially perfect alinement of the ball races is ensured, thereby effecting the proper functioning of the ball bearings; to provide a construction involving a minimum threading of the crank and the provision of a crank-hanger assembly the parts of which may be quickly and accurately positioned in use, and disassembled as for purposes of cleaning or repairing; to provide for the employment of so-called self-contained bearings, and especially for the use of such bearings in connection with cranks of the one-piece type; to provide a combined lock-washer and dust cap whereby economy of manufacture is effected and assembly of the parts is expedited; and generally to so improve upon prior structures of this general character, as to cause this portion of a cycle to be better adapted for performing the functions for which it is provided.

Referring to the accompanying drawings:

Figure 1 shows a crank-hanger assembly of a bicycle constituting one embodiment of my invention, this view showing the crank in elevation and the other parts associated therewith in longitudinal section. Figure 2 is a section taken at the line 2—2 on Fig. 1 and viewed in the direction of the arrows. Figure 3 is a view like Fig. 1 of another embodiment of the invention; and Figure 4, a section taken at the line 4—4 on Fig. 3 and viewed in the direction of the arrows.

Referring to Figs. 1 and 2, the crank of the assembly, shown therein, is illustrated at 5, this crank being of the so-called one-piece type and affording the oppositely-extending crank portions 6 and 7 and the intermediate shaft portion 8. The driving sprocket of the structure is represented at 9, this sprocket surrounding the shaft portion 8 of the crank and being confined thereon between an annular shoulder 10 on the crank, and a nut 11 which is screwed upon the threaded portion 12 of the shaft 8 and against the inner face of the sprocket 9. As usual in constructions of this character, the crank 6 is provided with an inwardly-extending lug 13 which, in the assembled position of the parts, extends into an opening 14 in the sprocket to ensure driving connection between the crank and the sprocket. The crank at its shaft portion 8 extends centrally through a crank housing 15 which constitutes a part of the frame of the bicycle, this housing being open at its opposite ends and containing inwardly-extending, preferably annular, shoulders 16 and 17 which are spaced apart and are set in from the opposite ends of the housing to define annular recesses 18 and 19 at the open ends of the housing. The bearings for the crank surround the axle portion 8 adjacent its opposite ends, and are located within the recesses 18 and 19, respectively, these bearings, according to the particular construction shown, being of the so-called self-contained type, viz, each involving an outer and an inner raceway with balls confined therebetween and the said parts held together to form a unitary structure which can be handled without danger of the parts becoming accidentally disassembled, such a type of bearing being common in the art. The particular type of bearing shown is of the combined radial and thrust type, the races being of such construction that the line of thrust is oblique to the axis of the bearing, in the construction shown substantially 75° to said axis, these bearings at opposite ends of the housing 15 being reversely positioned so that the lines of thrust of the respective bearings will converge in an outward direction relative to the shaft 8. The outer raceways of these bearings are represented at 20, these raceways being located within the recesses 18 and 19 and extending against the outer faces of the shoulders 16 and 17. The inner raceways of these bearings are represented at 21 and surround the cylindrical portions 22 of the shaft 8 of the crank, the ball bearings, located within and cooperating with the raceways 20 and 21, being represented at 23, these balls being shown as located within containers 24 in accordance with common practice. Each of the bearings is provided with a removable split ring 25 located within a groove 26 in the inner peripheral wall of the outer raceway 20 and projecting radially from the surface of said wall, to prevent accidental separation of the parts of the bearing. The shaft portion 8, at the end of the threaded part 12, presents an annular shoulder 27 between which and the adjacent inner raceway 21, a dust-cap-forming washer 28, surrounding the adjacent cylinder portion 22 of the shaft portion 8, extends, the parts being so arranged that the bearing located within the recess 18 is preferably slightly set in at its outer end, from the adjacent end of the housing 15 in order that the dust washer 28 may, at its outer periphery, extend at least part way into the recess 18. The end of the shaft portion 8 beyond the cylindrical portion 22 thereof, at the right hand side of Fig. 1, is of slightly reduced diameter and threaded as represented at 28ª this threaded portion containing in its periphery a groove 29 extending lengthwise thereof. A nut 30 is screwed upon the threaded part 28ª and against the outer end of the adjacent inner raceway 21, and confined between this nut and a lock-nut 31 also screwing upon the threaded part 28ª, is a combined lock washer and dust cap 32 which surrounds the threaded part 28ª and projects at a lug 33 thereon into the groove 29, the peripheral portion of this washer being deflected, as represented, to extend at its circumferential portion at least part way into the recess 19, the bearing in this recess extending short of the outer end thereof.

The parts of the structure described are assembled as follows. The sprocket 9 is first slipped over the outer end of the crank portion 7 and along the shaft portion 8 to the position shown in Fig. 1 in which it opposes the annular flange 10 and the lug 13 extends through the opening 14. The nut 11 is then slipped over the crank shaft in the same way and screwed upon the threads 12 to tightly clamp the sprocket in place. The washer 28 is then slipped over the crank 7 and shaft portion 8 to the position shown, and the crank then introduced into the housing 15 by introducing it at the outer end of its crank portion 7 into the left hand end of the housing 15 to cause its shaft portion 8 to lie within the housing, the bearings at the left hand side of the structure in Fig. 1 having, preliminary to this last-referred-to operation, been slipped over the crank portion 7 and shaft portion 8 to the position thereon shown in the drawing, whereby in the positioning of the crank relative to the housing 15 as stated, these bearings will enter the recess 18 with a sliding fit. The bearings at the right hand side of shaft 5 are then slipped over the outer end of the crank 7 to a position in which they surround the portion 22 of the shaft at the right hand side of this figure and enter the recess 19 with a sliding fit. The nut 30 is then slipped over the outer end of the crank 7 and screwed upon the threaded portion 28ª of the crank. It is through the medium of this nut, coacting with the shoulders 27, 16 and 17, that the crank, housing and bearings are caused to occupy the desired position relative to each other. It will be noted that by tightening the nut 30 as stated, the force is applied along the dotted lines "x" in Fig. 1, viz, from the nut 30 to the right hand inner raceway 21, thence diagonally through the balls 23 at the right hand side of Fig. 1, thence against the outer raceway 20 cooperating therewith and against the shoulder 17, and from the opposite end of the shaft 5 from the shoulder 27 against the dust washer 28, the inner raceway 21 of the bearings of the left hand side of Fig. 1, thence diagonally through the balls 23 cooperating therewith and against the outer raceway of this bearing and thence against the shoulder 16. Thus the tightening of the one nut 30 operates to draw both of the bearings at the opposite ends of the housing 15 into the desired position. The combined lock washer and dust cap 32 is then slipped onto the crank to the position shown, and the nut 31 slipped over the crank 7 and screwed upon the threads 28ª into tight contact with the washer 32.

By arranging the parts of the structure as shown and described, the shaft portion 8 of the crank intermediate its ends, may be partially cut away as represented and thereby lighten the structure.

The arrangement shown in Figs. 3 and 4 involves the employment of ball bearings of the radial type, the crank housing 15 and the crank 5 being of the same construction as that shown in Figs. 1 and 2, except the shaft portion 8 in Figs. 3 and 4 is not reduced between its ends as described of Fig. 1. The members of the bearings of Figs. 3 and 4 are designated as follows: the inner raceways, 34, the outer raceways, 35, and the series of balls confined therebetween, 36. In the particular construction now being described it is not practicable, in view of the fact that this construction employs radial bearings, to draw the bearings into seating engagement with the shoulders 16 and 17 through force exerted by the nut 30 as explained in connection with the construction shown in Fig. 1, it being necessary that the drawing of the bearings into said seating engagement be effected by force exerted in a plane parallel with the shaft portion 8 of the crank, and to this end there is interposed between the inner raceways 34, a sleeve member 37 which surrounds the shaft portion 8 and in effect forms a spacer, this sleeve being shown as formed of a plurality of alined separate sections to permit it to be slipped over the outer end of the crank 7 and upon the shaft portion 8 to the position shown, it being understood, however, that where the proportions of the parts will permit, this sleeve may be made in a single section. The sleeve portion 37 should be of such length that when the nut 30 is tightened to firmly clamp between it and the shoulder 27, the dust ring 28, inner raceways 34, sleeve portion 37 and dust ring 32, the outer raceways 35 will extend closely adjacent the outer faces of the shoulders 16 and 17, but not bear against them with sufficient pressure to exert a thrust between the raceways and the balls cooperating therewith in a direction oblique to the axis of the crank. In other words, the arrangement of the parts is such that the ball bearings will function purely as radial bearings, as it is intended they should.

The advantage of providing a structure in accordance with my invention, and particularly in accordance with the invention as embodied in the structure of Figs. 1 and 2, will be manifest. The parts of the structure may be readily assembled and disassembled, danger of the inner raceways being out of line with the outer raceways, which is apt to occur where the inner raceways are screwed upon the shaft portion of the crank, is avoided, the various parts of the structure are readily drawn to the desired positions by merely adjusting one nut and other advantages as will be manifest. The feature of combining in the one member, viz, the member 32, the double function of that of a lock washer and dust cap results in economy and simplification of structure.

While I have illustrated and described certain embodiments of my invention, I do not wish to be understood as intending to limit it thereto, as the invention may be embodied in other forms, and those shown may be variously modified and altered without departing from the spirit of my invention.

What I claim as new, and desire to secure by Letters Patent, is:

1. In a crank-hanger assembly, the combination of a crank housing open at its opposite ends, a crank rotatable in said housing, said crank having a shoulder near one end of its shaft portion and threaded at its opposite end, a nut on said threaded portion and self-contained bearings comprising a unitary assemblage of raceways and anti-friction elements so united as to prevent accidental separation of the parts, said bearings surrounding said crank and being located, respectively, in the end of said housing and held in clamped position between, and by, said shoulder and nut.

2. In a crank-hanger assembly the combination of a crank housing open at its opposite ends and containing inwardly-extending shoulders between its ends, a crank rotatable in said housing, said crank having a shoulder near one end of its shaft portion and threaded at its opposite end, a nut on said threaded portion, and ball bearings each formed of a series of balls and an inner and an outer raceway between which said balls are located, said ball bearings surrounding said crank and being located, respectively, in the ends of said housing and opposing said shoulders and held in clamped position between and by said nut and said shoulder on said crank.

3. In a crank-hanger assembly, the combination of a crank housing open at its opposite ends and containing inwardly extending shoulders between its ends, a crank rotatable in said housing, said crank having a shoulder on one end of its shaft portion and threaded at its opposite end, a nut on said threaded portion, and self-contained bearings comprising a unitary assemblage of raceways and anti-friction elements so united as to prevent accidental separation of the parts, said bearings surrounding said crank and being located, respectively, in the ends of said housing and opposing said shoulders and held in clamped position between, and by, said nut and by said shoulder on said crank.

4. In a crank-hanger assembly, the combination of a crank housing open at its opposite ends, a crank rotatable in said housing, self-contained bearings comprising a unitary assemblage of raceways and anti-friction elements so united as to prevent accidental separation of the parts and of a type in which the load angle is obliquely disposed relative to the axis of the bearing, said bearings surrounding said crank and being located, respectively, in the ends of said housing, and means holding said parts in assembled relation.

5. In a structure comprising a housing containing a member rotatable therein, with bearings for said member located in said housing, said member containing a groove, a combined lock-washer and dust-guard in the form of a ring containing an inwardly-extending lug located in said groove, with its circumferential marginal portion extending into close proximity to the inner circumferential wall of said housing.

6. In a crank-hanger assembly, the combination of a crank housing open at its opposite ends and provided between its ends with inwardly-extending shoulders, a crank rotatable in said housing and provided near one end with a shoulder and adjacent its opposite end with a threaded portion, a nut screwing on said threaded portion, and ball bearings of the type in which the load angle is oblique to the axis of the bearings, said bearings each comprising a series of balls and an inner and an outer raceway between which said balls are located, said bearings being located in the end of said housing and opposing said shoulders, one of said bearings being located adjacent said shoulder on said crank and the other adjacent said nut at opposite sides of said first-referred-to shoulders, said inner raceways being adapted to be assembled thereon by sliding along said shaft, the load-angles of said bearings being convergent radially of said crank, whereby tightening said nut operates to cause said outer raceways to be drawn against said shoulders on said housing and said inner raceways to be clamped between said nut and said shoulder on said crank.

GEORGE S. LEWIS.